United States Patent
Le Parquier et al.

[15] 3,636,561
[45] Jan. 18, 1972

[54] ELECTROMAGNETIC DETECTION RECEIVER

[72] Inventors: Guy Francis Le Parquier; Henri Charles Poinsard; Marie-Jacques Jullien, all of Paris, France

[73] Assignee: Thomson-CSF, Paris, France

[22] Filed: Sept. 29, 1969

[21] Appl. No.: 861,889

[30] Foreign Application Priority Data

Oct. 15, 1968 France..................................169986

[52] U.S. Cl..............................................343/7.7, 343/16 M
[51] Int. Cl.......................................................G01s 9/42
[58] Field of Search.......................................343/7.7, 16 M

[56] References Cited

UNITED STATES PATENTS 3,438,030  4/1969  Dickey....................................343/7.7
3,550,126  12/1970  Van Hijfte et al....................343/7.7 X

*Primary Examiner*—T. H. Tubbesing
*Attorney*—Cushman, Darby & Cushman

[57] ABSTRACT

In a monopulse radar system the phase difference between successive echoes from the same target is modified to make this difference equal to what it would be if the target were on the axis of the beam.

7 Claims, 4 Drawing Figures

ELECTROMAGNETIC DETECTION RECEIVER

The present invention relates to mobile electromagnetic detection or radar systems of the monopulse type.

In mobile radars of this kind, designed to detect aircraft and other moving objects, ground echoes which can be more powerful than echoes from desired targets are frequently a source of disturbance.

Frequency filtering has been employed to eliminate such parasitic echoes, since fixed targets produce echoes having a well defined Doppler frequency, which is a function of the radar velocity and of the angle which the radiated beam forms with the velocity vector. However, since the beam has a certain width, this angle varies with the position of the target within the beam and the frequency spectrum of the ground echoes has a certain width.

If the radar used is to exhibit no distance ambiguity, its recurrence frequency is of necessity low and the bandwidth of the ground echoes may become too large in comparison therewith. The ground echo rejection filter, whose bandwidth must cover the ground echo spectrum, would then suppress too high a proportion of the echoes from moving targets.

It is an object of this invention to reduce the width of this band.

In accordance with the invention, there is provided a receiver for a moving monopulse radar system comprising means for supplying the sum signal $\Sigma$, and a M.T.I. system comprising a coherent wave generator, and a phase detector having a reference input coupled to said generator and an echo input coupled to said signal $\Sigma$ supplying means said output coupled to said output, said radar receiver further comprising, between said signal $\Sigma$ supplying means and said detector echo input, means for modifying the phase of echoes originating from the same target, fed to said echo input, by an amount proportional to the angle between the direction from which said echoes originate and the radar beam axis, so that the phase variation over at least one radar repetition period between successive so modified echo sum signals originating from the same target is equal to that between nonmodified successive echoes of a target located on the beam axis.

A reduction in the bandwidth of the ground echo spectrum in a ratio of six and better, may thus be achieved. Of course, this reduction depends upon the parameters of the radar equipment and upon the accuracy with which the various data are known, and also upon the quality of the calculation.

Since, conventionally, the effective signal is obtained from the echoes of several successive recurrences, the phase correction is effected in such a way that in respect of these recurrences, the phase differences of the various echoes is zero in the case of the ground echoes.

For a better understanding of the invention and to show how the same may be carried into effect reference will be made to the drawing accompanying the ensuing description and in which.

In order not to overburden unnecessarily the description and the figures, the conventional elements of monopulse radar equipments have not been described in detail in the following specification, except where this is necessary for the understanding of the invention.

Figure 1:
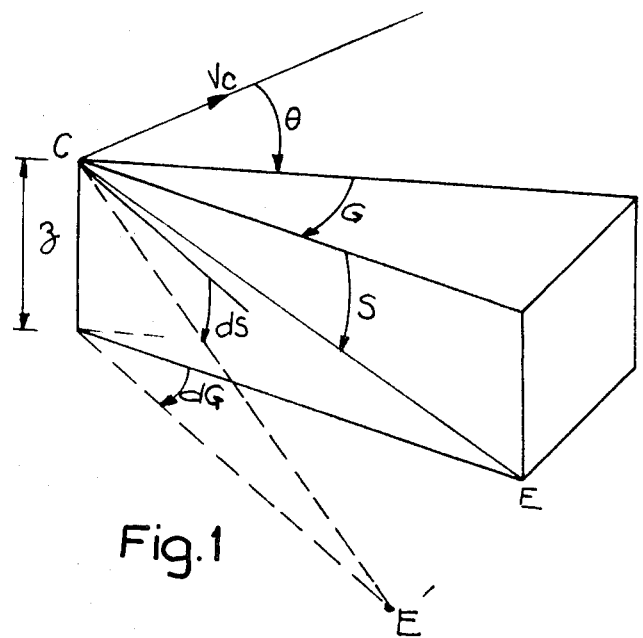
FIGS. 1 and 2 are explanatory diagrams.

In FIG. 1, C denotes an aircraft flying at an altitude $z$, the velocity vector $V_c$ making an angle $\theta$ with the horizontal and thus defining the slope of the aircraft flight path.

The ground portion E, seen from the plane under an elevation angle $S$ and an azimuthal angle $G$, has a radial velocity $V_r$ in relation to the aircraft, such that:

$$V_r = V_c [\cos \theta \cos G \cos S + \sin \theta \sin S].$$

A ground portion E', in the vicinity of E and seen under the angles $S+dS$ and $G+dG$ has a relative radial velocity $V_r+dV_r$, such that $$dV_r = -V_c[\cos(\theta \cos S \sin G \, dG + \cos G \sin S \, dS] + V_c \sin \theta \cos S \, dS.$$

Since, in fact, $\theta$ is virtually zero and varies only slowly, since $S$ is likewise small, since the variation $dS$ is limited to $\pm 2$ to $3°$, and since the pulse width is small, one may write, disregarding third order terms and beyond:

$$dV_r \approx -V_c \cos S \sin G \, dG.$$

The Doppler frequency of the element E, viewed in the direction of the radioelectric axis having an azimuth $G$ and an elevation $S$, is thus given by $$f_{dE} = \frac{2V_r}{\lambda} \approx \frac{2V_c}{\lambda} \cos G \cos S$$

and that of an element E', viewed in the direction $G+dG$, by
$f_{dE'}+\Delta f_d$ with $\Delta f_d \approx -(2V_c/\lambda) \cos S \sin G \, dG$, $\gamma$ being the carrier wavelength of the radar equipment.

The difference $\Delta \phi(t)$ between the phases of the echo reflected by E' and that reflected by E, varies with time in accordance with the expression $$\Delta \phi(t) = 2\pi \Delta f_d t = -4\pi (V_c/\gamma) \cos S \sin G dG t + \phi_o,$$

$\phi_o$ being a constant depending upon the time origin.

From one recurrence to the next, the variation $\Delta \phi(T_r)$ of this phase is substantially defined by:

$$(4\pi/\gamma) V_c \cos S \sin G dG T_r,$$

$T_r$ being the repetition periodicity of the radar equipment.

All the terms in the latter expression are known:

$\gamma$ is a characteristic of the radar equipment;

$V_c$ is determined by the air speed computer system of the aircraft;

Sin $G$ and cos $S$ are given directly, or after transformation of coordinates, by the system which displays the position of the aircraft; and $dG$ is given by the monopulse system which instantaneously calculates the pointing error of an echo.

It is therefore possible to modify the phase of each echo in such a way that the phase variation from one recurrence to the next should be that of an echo from an object lying on the axis of the radar beam: for ground echoes, this variation will then be zero whatever the position of the point $E'$ within the beam.

Figure 2:
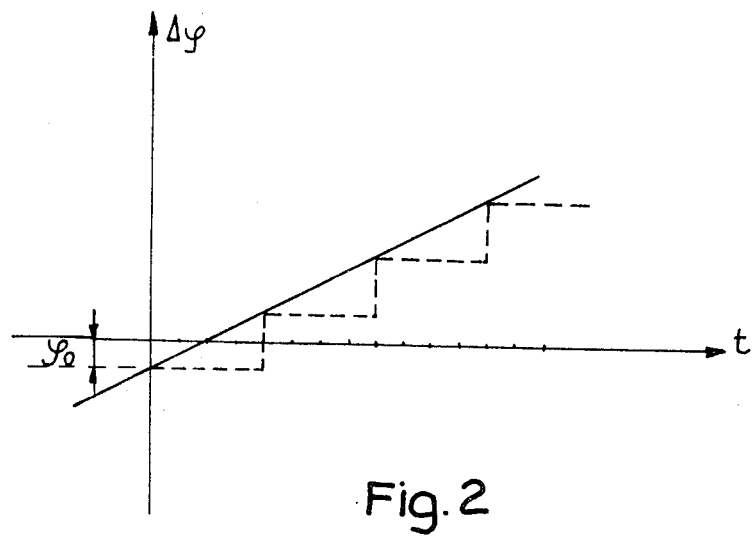

In FIG. 2, the variation as a function of time of the interval between the phases of an echo from a target which does not lie on the pointing axis ($dG \ne 0$) and an echo from a target located on the beam axis, has been plotted in full line; it has been plotted in broken line in the case when the above-mentioned correction is made, the assumption having been made that the processed signal is produced from the echoes corresponding to four radar recurrences, the vertical lines on the $t$ axis corresponding to these recurrences.

Actually, known phase shifter systems do not, in view of price and size considerations, enable cumulative correction of the phase difference of all the recurrences to be carried out, and it is in fact necessary to start again from a zero phase correction after such a number of recurrences that the relative phase shift of the last echo considered with respect to the first one, has an order of magnitude compatible with practically usable phase shifter arrangements, for example those using varactors.

Figure 3:
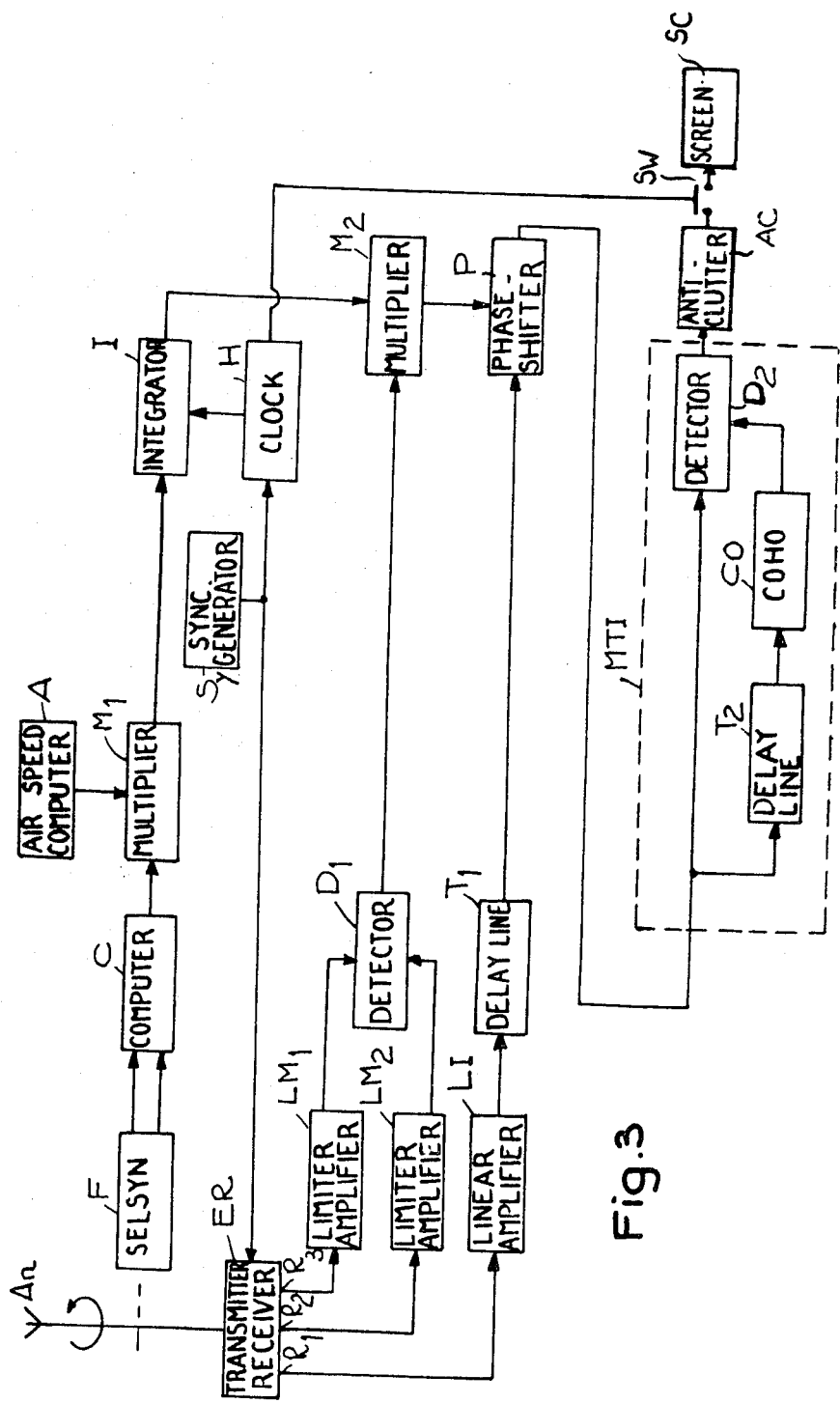
FIGS. 3 and 4 show embodiments of radar systems in accordance with the invention.

FIG. 3 is the diagram of a first preferred embodiment of the invention. It is concerned with the case of a monopulse radar system comprising circuits for generating conventional signals $\Sigma+j\Delta$ and $\Sigma-j\Delta$, $\Sigma$ and $\Delta$ designating in the conventional way the sum signal and the difference signal of a monopulse radar receiver operating in azimuth. In this case, the signal $\Delta G$ is generated directly.

In FIG. 3, a single block ER designates the transmitter of the radar system and that portion of the receiver circuits which provides the signals $\Sigma$, $\Sigma-j\Delta$ and $\Sigma+j\Delta$ appearing at the respective outputs $R_1$, $R_2$ and $R_3$.

The antenna $A_n$, which is electrically coupled to the unit ER is mechanically coupled to a device F, for example a selsyn system, which at any instant indicates the elevation $S$ and azimuth $G$ of the beam.

A computer C, for example an arrangement of resolvers followed by a multiplier, produces the product $\cos S \sin G$, and a multiplier $M_1$ with two inputs respectively coupled to the output of the multiplier and to the air speed computer A which provides at any instant the velocity $V_c$, furnishes the signal $V_c \cos S \sin G$ which is integrated in an integrator I, for example an amplifier-capacitor arrangement, the latter being reset to zero by a clock H. The latter produces, under the control of synchronizing pulses, coming from the synchrogenerator $S_y$ with a recurrence frequency $f$, pulses at a frequency $f_H = f/n$, $n$ being the number of recurrences defining the phase correction, for example four in the case of the diagram of FIG. 2.

On the other hand the signals $\Sigma + j\Delta$ and $\Sigma - j\Delta$, after limited amplification respectively at $LM_1$ and $LM_2$, are applied to the inputs of an amplitude-phase detector $D_1$ which, in the conventional way, produces the signal $\Delta G$. The latter, and the output signal from the integrator, are applied to a multiplier $M_2$, for example one employing the Hall effect.

The signal $\Sigma$, after linear amplification in an amplifier $Li$ and, if need be, after having been slightly delayed in a delay system $T_1$ in order to take into account the delays in the multiplier and phase detector circuits, is applied to the variable phase-shifter P, for example of the varactor type, which is controlled by the output signal from the multiplier $M_2$ and produces in the signal $\Sigma$ a phase shift which is proportional to the control voltage.

The signal $\Sigma$, whose phase has been thus corrected, is then processed in a known manner. By way of example, in FIG. 3, the fixed echoes are processed as described in the U.S. Pat. No. 3,195,128, assigned to the assignee of the present application. This arrangement is placed before the conventional M.M.T.I. arrangement which then eliminates ground echoes also when the radar is moving. The signal, after experiencing a delay equal to or slightly greater than the duration of a pulse at $T_2$ (FIG. 3) synchronizes the coherent oscillator CO.

The phase detector $D_2$ compares the signal and the coherent oscillation thus produced. A device for eliminating fixed echoes, for example an anticlutter arrangement using cascade-connected delay lines, is subsequently connected at AC. The screen SC of the receiver is coupled to the output of said latter device through the contact-breaker $S_w$, the latter of course being controlled by the clock H.

In this embodiment, the integration time $t$ is a matter of choice and the number of recurrences compared is limited exclusively by the phase-shift possibilities.

For example, in the case of a radar system operating at a wavelength $\lambda = 3.2$ cm., with a repetition frequency $f_r = 1/T_r = 4,000$ c.p.s. using a beam with an azimuthal angle $2\alpha$ at 3 db. which is equivalent to 5°, and a scanning rate of 100°/second, i.e., such that the antenna and the pointing error may be considered as fixed during a number of recurrence intervals, the phase correction from one recurrence interval to the next for an azimuthal scan of $G = 45°$ and a maximum pointing error $dG = \alpha = 2°5$, is equal to 0.9 radians.

Figure 4:
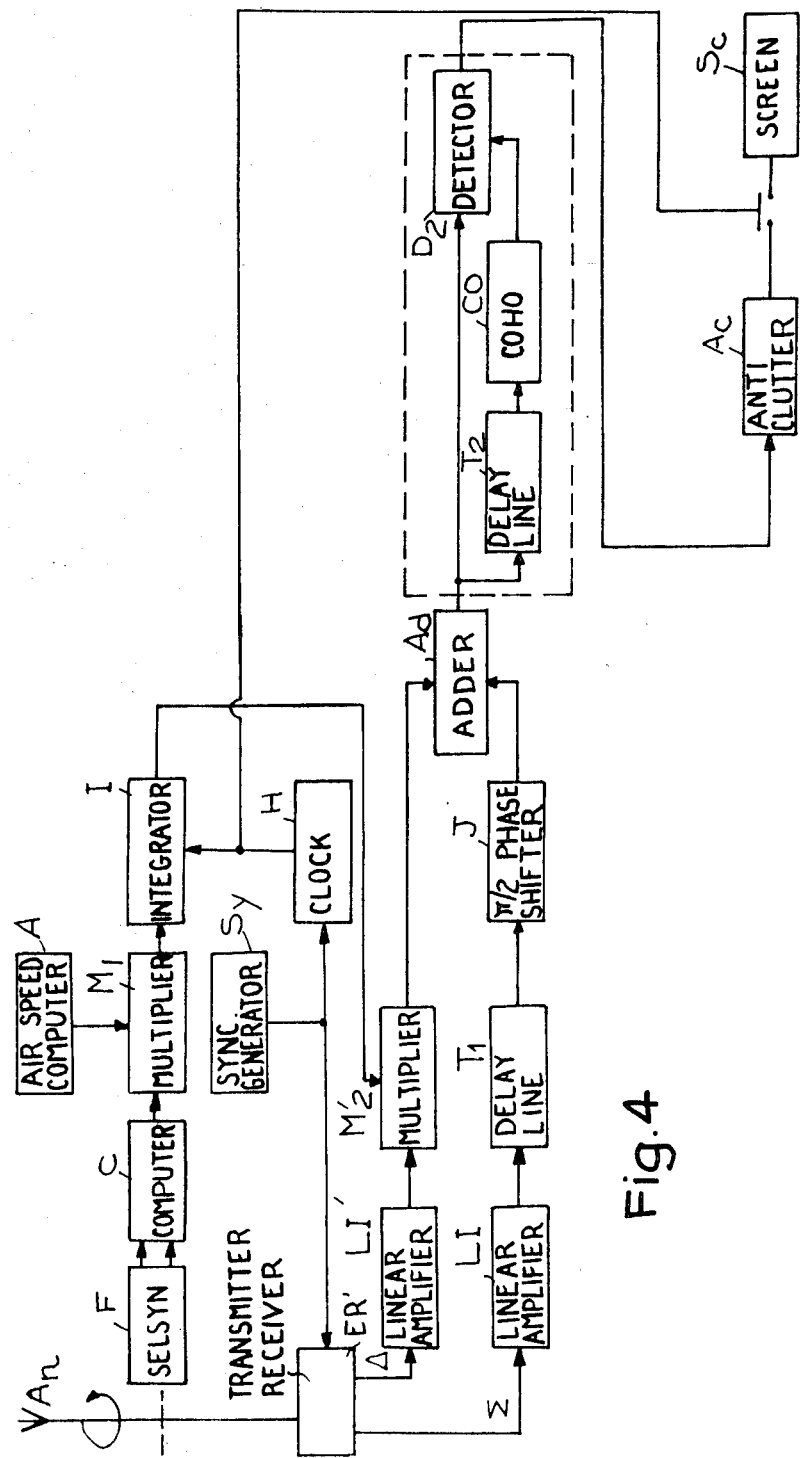

Using a varactor-type phase-shift element which enables phase correction of between 0° and $4\pi$ to be achieved, the phase compensation can be carried out over four recurrence intervals. FIG. 4 is another example of the implementation of the invention, in the case of a system, the transmitter-receiver unit ER' of which supplies signals $\Sigma$ and $\Delta$ but not the signals $\Sigma + j\Delta$ and $\Sigma - j\Delta$.

In this case, it may be useful first to form the signal $\Delta \cos S \sin G \, V_c$. The signal, applied to the echo input of the phase director is then formed by the vectorial sum of the signals $\Delta \cos S \sin G \, V_c \, \Sigma$, after a phaseshift by $\pi/2$ of one of the signals forming this sum, this of course at the intermediate frequency level. The signal representing this sum is phase shifted with respect to $\Sigma$ by $\psi$, whose tangent is equal to
$$V_c \cdot \cos S \sin G \cdot (\Delta/\Sigma) \cdot t.$$
Now $dG$ is equal to $\Delta/\Sigma$.

As long as $V_c \cos S \cdot \sin Gt$ is small enough for allowing the angle and its target to be considered equivalent, one may write $\psi = V_c \cdot \cos S \cdot \sin G \cdot dG \, t$, i.e., $\psi = \phi$.

To this end, the multiplier $M'_2$ is supplied on the one hand with the output signal from the integrator I, and on the other hand with the signal $\Delta$.

Of course, the signals $\Delta$ and $\Sigma$ are first amplified in linear amplifiers LI' and LI. The signal $\Delta'$ resulting from this multiplication, and the signal $\Sigma$ shifted in phase by $\pi/2$ in a phase shifter J, are applied to the inputs of an adder A$d$.

The output signal from the adder A$d$ is subsequently processed in the same manner as the output signal from the phase shift element P of FIG. 3. However, this signal is acceptable only if the time of integration is sufficiently short to enable $\phi$ to be considered as equal to tan $\phi$, and this restricts the application of this circuit. On the other hand, the amplitude of the effective signal is in this case no longer equal to that of the sum signal, as in the first case, but is higher than said amplitude in a ratio which depends precisely upon the angle $\phi$.

Of course, the invention is not limited to the embodiments described and illustrated by way of example, and can be applied to other radar equipments. In particular, no account has been taken of correction of the elevational angle, since the pulse widths employed and the elevation tracking angles are generally sufficiently small to render any elevation correction unnecessary, however, it goes without saying that such correction could be made if necessary; the correcting signal would then of course be obtained by using two identical devices in series, the second then producing the signal $V_c [(\cos S \sin G \, dG + \cos G \sin S \, dS)]$, $\theta$ in all cases being assumed to be close to zero.

The signal controlling the phase shift can of course be produced by circuits other than those described, which fall within the scope of a person skilled in the art; in particular if only a single target is involved, the correction can be a continuous function, that is to say that in the circuits described the zeroing of the integrator is dispensed with, the essential thing being that at some point in the circuit the product $V_c \cos S \sin G \, \Delta \, G$ is formed.

What is claimed, is:

1. A receiver for a moving monopulse radar system comprising means for supplying the sum signal $\Sigma$, and a M.T.I system comprising a coherent wave generator, and a phase detector having a reference input coupled to said generator and an echo input coupled to said signal $\Sigma$ supplying means, said radar receiver further comprising, between said signal $\Sigma$ supplying means and said detector echo input, means for modifying the phase of echoes originating from the same target, fed to said echo input, by an amount proportional to the angle between the direction from which said echoes originate and the radar beam axis, so that the phase variation over at least one radar repetition period between successive so modified echo sum signals originating from the same target is equal to that between nonmodified successive echoes of a target located on the beam axis.

2. A receiver according to claim 1, wherein said modifying means comprise phase shifting means having a signal input coupled to said signal $\Sigma$ supplying means, a control input, and an output coupled to said detector echo input, and means, for elaborating a signal representative of said amount, having an output coupled to said control input.

3. A receiver according to claim 2, comprising a radar displacement velocity $V_c$ signal input, a radar beam axis elevation angle $S$ signal input, and a radar beam axis bearing angle $G$ signal input, and a circuit elaborating signal $\Delta G = \Delta/\Sigma$, where $\Delta$ is the monopulse difference signal, said circuit having an output, wherein said means for elaborating the signal representative of said amount comprise computing means, having respective inputs coupled to said $V_c$ input, to said $S$ input, and to said $G$ input, and an output supplying a signal representative of the product $V_c \cdot \cos S \cdot \sin G$, integrating means having an input coupled to said computing means output and an output and multiplying means having a first input coupled to said $\Delta G$ input, a second input coupled to said integrating means output and an output coupled to said phase shifter control input.

4. A receiver according to claim 3, wherein, said radar system having a synchronization system, said integrating means comprises a reset input coupled to said synchronization system.

5. A receiver according to claim 1, comprising at least one signal $\Delta$ output, where $\Delta$ is a monopulses difference signal, wherein said modifying means comprise adding means having a first input coupled to said signal $\Sigma$ supplying means, a second input, and an output coupled to said detector echo input, means having an input coupled to said signal $\Delta$ output, and an output coupled to said adding means second input, for supplying thereto a signal proportional to signal $\Delta$, and $\pi/2$ phase shifting means in series with one of said adding means input.

6. A receiver according to claim 5, comprising a radar displacement velocity $V_c$ signal input, a radar beam axis elevation angle $S$ signal input, and a radar beam axis bearing angle $G$ signal input, wherein said means coupled to said adding means second input comprise computing means having respective inputs coupled to said $V_c$, $S$ and $G$ inputs, and an output supplying a signal representative of the product $V_c \cdot \cos S \cdot \sin G$, integrating means having an input coupled to said last output and an output, and multiplying means having two inputs respectively coupled to said last output and to said $\Delta$ output, and an output coupled to said second input of said adding means.

7. A receiver according to claim 6, wherein, said radar system having a synchronization system, said integrating means comprises a reset input coupled to said synchronization system.

* * * * *